(12) United States Patent
Xiao (10) Patent No.: US 10,677,482 B2
(45) Date of Patent: Jun. 9, 2020

(54) MAGNETIC SUSPENSION TYPE WATER ADDING DEVICE AND AIR HUMIDIFIER

(71) Applicant: Comefresh Electronic Industry Co., Ltd., Xiamen, Fujian (CN)

(72) Inventor: Yongrui Xiao, Xiamen (CN)

(73) Assignee: Comefresh Electronic Industry Co., Ltd., Xiamen, Fujian (CN)

( * ) Notice: Subject to any disclaimer, the term of this patent is extended or adjusted under 35 U.S.C. 154(b) by 268 days.

(21) Appl. No.: 15/868,941

(22) Filed: Jan. 11, 2018

(65) Prior Publication Data
US 2018/0195747 A1  Jul. 12, 2018

(30) Foreign Application Priority Data
Jan. 11, 2017 (CN) .......................... 2017 1 0019709

(51) Int. Cl.
| | | |
|---|---|---|
| B01F 3/04 | (2006.01) |
| F24F 6/02 | (2006.01) |
| F16K 31/06 | (2006.01) |
| F16K 31/08 | (2006.01) |
| F24F 6/00 | (2006.01) |

(52) U.S. Cl.
CPC .................. *F24F 6/02* (2013.01); *B01F 3/04* (2013.01); *F16K 31/0655* (2013.01); *F16K 31/082* (2013.01); *F24F 2006/008* (2013.01)

(58) Field of Classification Search
CPC ................................ B01F 3/04; B01F 3/04007
USPC ............................................ 261/30, 72.1, 38
See application file for complete search history.

(56) References Cited

FOREIGN PATENT DOCUMENTS

JP          10148438 A  *  6/1998  ................ F25C 1/24

* cited by examiner

*Primary Examiner* — Robert A Hopkins
(74) *Attorney, Agent, or Firm* — Raymond Y. Chan; David and Raymond Patent Firm (57) ABSTRACT

An air humidifier and its magnetic suspension type water adding device are provided. The magnetic suspension type water adding device includes a water tank, a water slot, a water outlet valve, and a magnetic power generator, wherein water in the water tank enters the water slot to provide supplement water through the water outlet valve. A magnetic element is arranged on the water outlet valve and matched with the magnetic power generator, so that the water outlet valve forms a magnetic suspension switch structure, which is arranged on the bottom of the water tank, wherein magnetic force of N-pole or S-pole is controlled through a current direction, and the magnetic suspension switch structures acts with the magnetic force part, so that a sealing part of the water outlet valve is pushed to open a water hole to provide supplement water into the water slot.

13 Claims, 6 Drawing Sheets

MAGNETIC SUSPENSION TYPE WATER ADDING DEVICE AND AIR HUMIDIFIER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention discloses a magnetic suspension type water adding device and air humidifier, which is related to the technical field of air humidification device according to the International Patent Classification (IPC).

Description of Related Arts

A humidifier is a household appliance that increases humidity of the room. A humidifier can moisten the air by spreading mist for even humidification and better health such that a comfortable living environment can be built.

Drawbacks regarding ways of adding water of conventional humidifiers on the market include:

1. When a conventional humidifier requires water, the user has to lift the water tank, add water into the water tank, and bring the water tank back into the humidifier so as to resume the operation of the humidifier.

2. If the volume of water tank is 3-9 L, it will be hard to lift and carry due to its weight, which also creates potential risks to the users.

3. There is humidifier in the market that utilizes electromagnetic valve for water adding. Unfortunately, it is undesirable due to short service life and difficulty in installation because of its complex mechanism and poor leakproofness.

4. Some other humidifiers use flotage method, which are not suitable for mass production because of high machining precision requirement on the valve gate.

5. Lastly, some humidifiers apply gasket ring on the watering hole that may cause water leakage if the user fails to turn the gasket ring to the end.

China Patent No. CN105909834A discloses a water valve structure of a humidifier, including a water draining valve mounted on a water tank drain pipe, and a water level control device arranged in a steam generation cavity. The water level control device includes an ejector rod, an electromagnetic valve and a floater switch connected with the electromagnetic valve. The ejector rod is positioned below the water draining valve. The floater is displaced up and down along with the water level change and, when the position of the floater is lower than the reed switch, the electromagnetic valve will be started to eject up the ejector rod, such that the water draining valve will be turned into a drain state.

In view of above, the rod of the electromagnetic valve pierces into the steam generation cavity to interact with the ejector rod. As a result, there is a hole on the steam generation cavity where water leakage can easily occur.

SUMMARY OF THE PRESENT INVENTION

In order to improve on the drawbacks of the conventional technology, the present invention provides a magnetic suspension type water adding device that utilizes the principle of magnetic suspension to control the open and close of the valve gate of the water slot for water adding of the humidifier. The device has advantages in its reasonable structure, long service life, easy maintenance, and etc.

In order to achieve the above and other advantages, the present invention can be implemented and embodied as the following.

A magnetic suspension type water adding device, comprising a water tank having a water slot arranged on a bottom thereof, a water outlet valve, and a magnetic power generator. The water slot provides a space in the water tank for steam formation. The bottom of the water tank has an outlet arranged therein and a water outlet valve arranged at the outlet. Water in the water tank provides supplement into the water slot through the water outlet valve. The water outlet valve comprises a magnetic element arranged thereon. The magnetic element is coupled with the magnetic power generator so as to form a magnetic suspension switch structure. The magnetic power generator is arranged outside of the water slot. The magnetic force generated by the magnetic power generator acts with the magnetic element of the water outlet valve across a wall of the water slot so as to drive the sealing part of the water outlet valve to selectively open or close the water hole of the water outlet valve.

Further, the water outlet valve comprises a valve seat and a valve core. The valve seat is sealingly coupled at the outlet of the water tank. The valve seat has a water hole provided therein. The valve core is arranged at the water hole. A bottom end of the valve core is coupled with the magnetic element so as to interact with the magnetic power generator for controlling the valve core to selectively open or close the water hole of the water outlet valve.

Further, the valve core comprises a valve plate and a valve rod. The valve plate is connected with the valve rod. The valve plate seals the water hole of the valve seat. The valve rod extends toward the water slot. The bottom end of the valve rod is coupled with the magnetic element. The valve rod comprises a guiding portion arranged on the side thereof. The valve seat has a guiding groove provided therein matching with the guiding portion. The valve core shifts up and down along the guiding groove so as to selectively attach or detach the valve plate and the water hole of the valve seat.

Further, the valve rod comprises a return spring sleeved thereon. The return spring is positioned below the water hole of the valve seat so as to secure the valve plate at the water hole of the valve seat.

Further, the water slot has an external groove provided corresponding to the location of the outlet of the water tank. The magnetic power generator is arranged in the external groove. The magnetic power generator comprises a pontil and a coil winded around the pontil. The coil is connected to an external direct current power supply so as to, based on the current flow, generate magnetic force of N-pole or S-pole on the magnetic power generator toward the acting end of the magnetic element. The magnetic force of N-pole or S-pole generates magnetomotive force by interacting with the S-pole or N-pole of the magnetic element across a wall of the water slot. The physical principle of repulsion or attraction between same or different poles is utilized, so as to enable the valve core coupling with the magnetic element for selectively opening or closing the water hole of the water outlet valve.

Further, the water slot comprises a water level detection device provided therein and connecting with a controller. The controller controls the current direction of the coil of the magnetic power generator.

Further, when the water slot is in a low water state, the water level detection device sends a low water signal to the controller, so that the magnetic power generator generates a magnetic force of the same pole to the magnetic element so as to push the valve core to open the water hole of the water outlet valve to supplement water. When the water slot is in a full water state, the water level detection device sends a full water signal to the controller, so that the magnetic power generator generates magnetic force of the opposite pole to the magnetic element so as to attract the valve core to close the water hole of the water outlet valve.

An air humidifier includes a magnetic suspension type water adding device.

Further, the water tank further comprises a steam pipe provided therein. A bottom of steam pipe is connected with the slot, while the top of the steam pipe penetrates the water lid to form a steam outlet. The water tank is arranged on the base. The water slot is provided in the base and coupled with the water tank.

According to the magnetic suspension type water adding device as disclosed in the invention, the magnetic suspension switch structure is arranged on the bottom of the water tank, magnetic force of N-pole or S-pole is controlled through a current direction, and the magnetic suspension switch structures acts with the magnetic force part. Accordingly, a sealing part of the water outlet valve is pushed to open a water hole to provide supplement water into the water slot, allowing a user to add water in easily. The magnetic suspension type water adding device is highly safe, especially for an old person or young child to use the humidifier with the structure. Besides, the magnetic suspension type water adding device of the present invention has advantages of high productivity, long service life, convenient maintenance, low costs, etc.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1-6, a magnetic suspension type water adding device 100 according to an exemplary embodiment of the present invention is illustrated, which comprises a water tank 1, a water slot 2, a water outlet valve 3, and a magnetic power generator 4. The water slot 2 is arranged on a bottom of the water tank 1 and provides a space therein for steam formation. The bottom of the water tank 1 has an outlet provided therein and a water outlet valve 3 configured at the outlet. Water in the water tank 1 provides supplement into the water slot 2 through the water outlet valve 3. The water outlet valve 3 comprises a magnetic element 31 arranged thereon. The magnetic element can be a ferromagnetic magnet, ferromagnetic permanent magnet or magnetite. The two ends of the magnetic element are respectively S-pole and N-pole. The magnetic element 31 is coupled with the magnetic power generator 4 so as to form a magnetic suspension switch structure. The magnetic power generator 4 is arranged outside the water slot 2.

Figure 1:
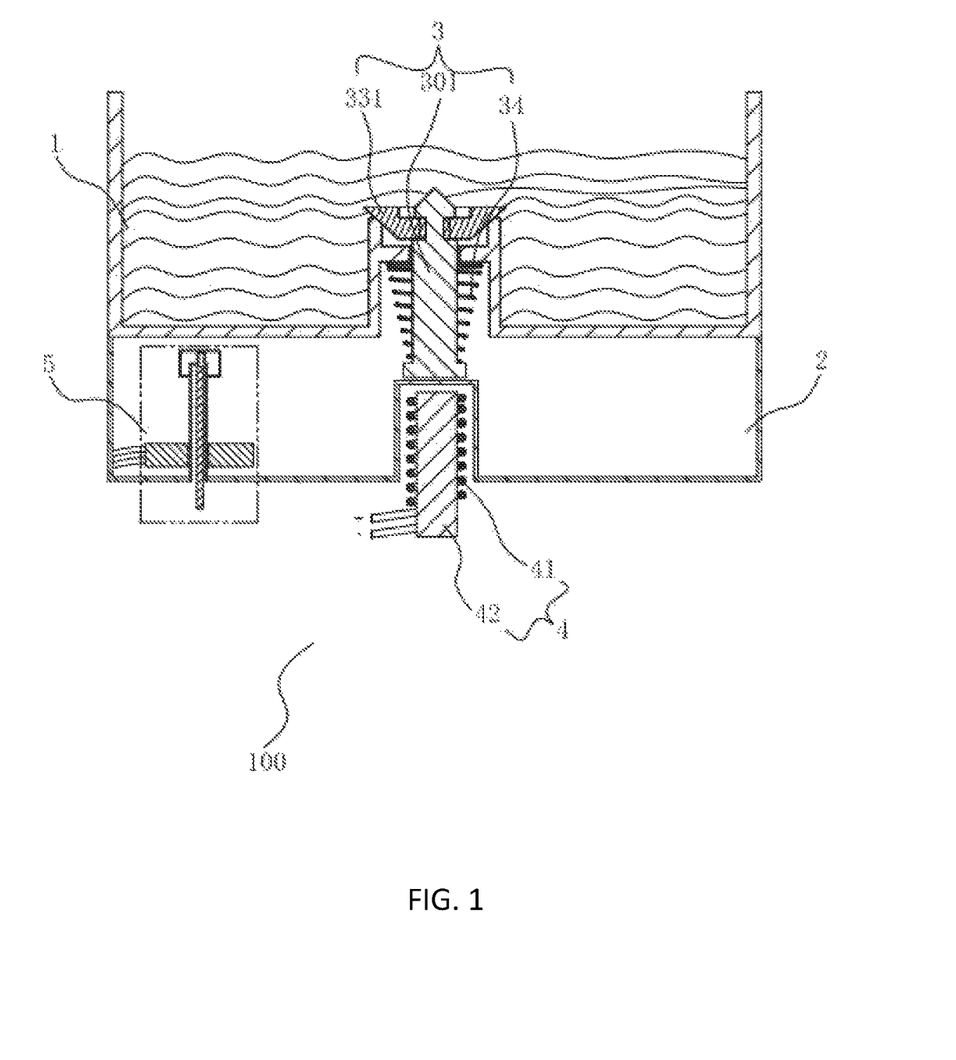
FIG. 1 is a perspective view according to an exemplary embodiment of the present invention.
Figure 2:
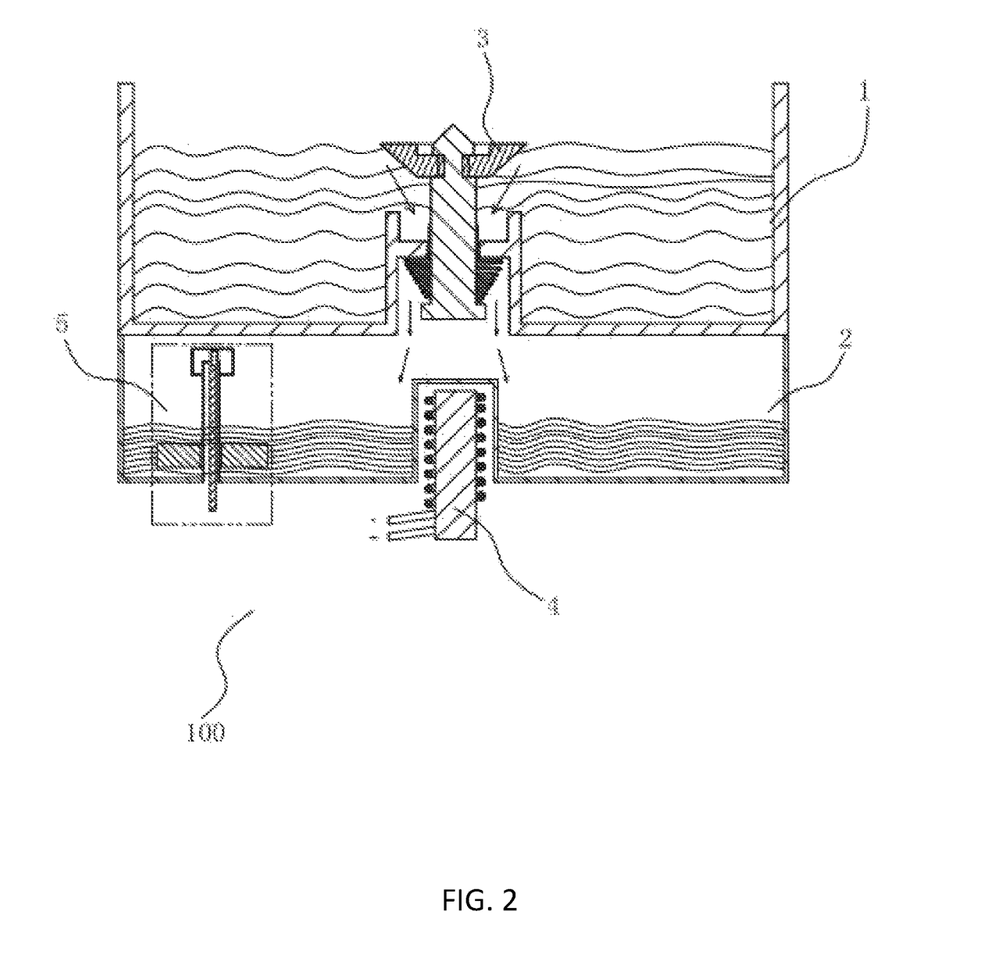
FIG. 2 is a perspective view illustrating water supplementation according to the above embodiment of the present invention.
Figure 3:
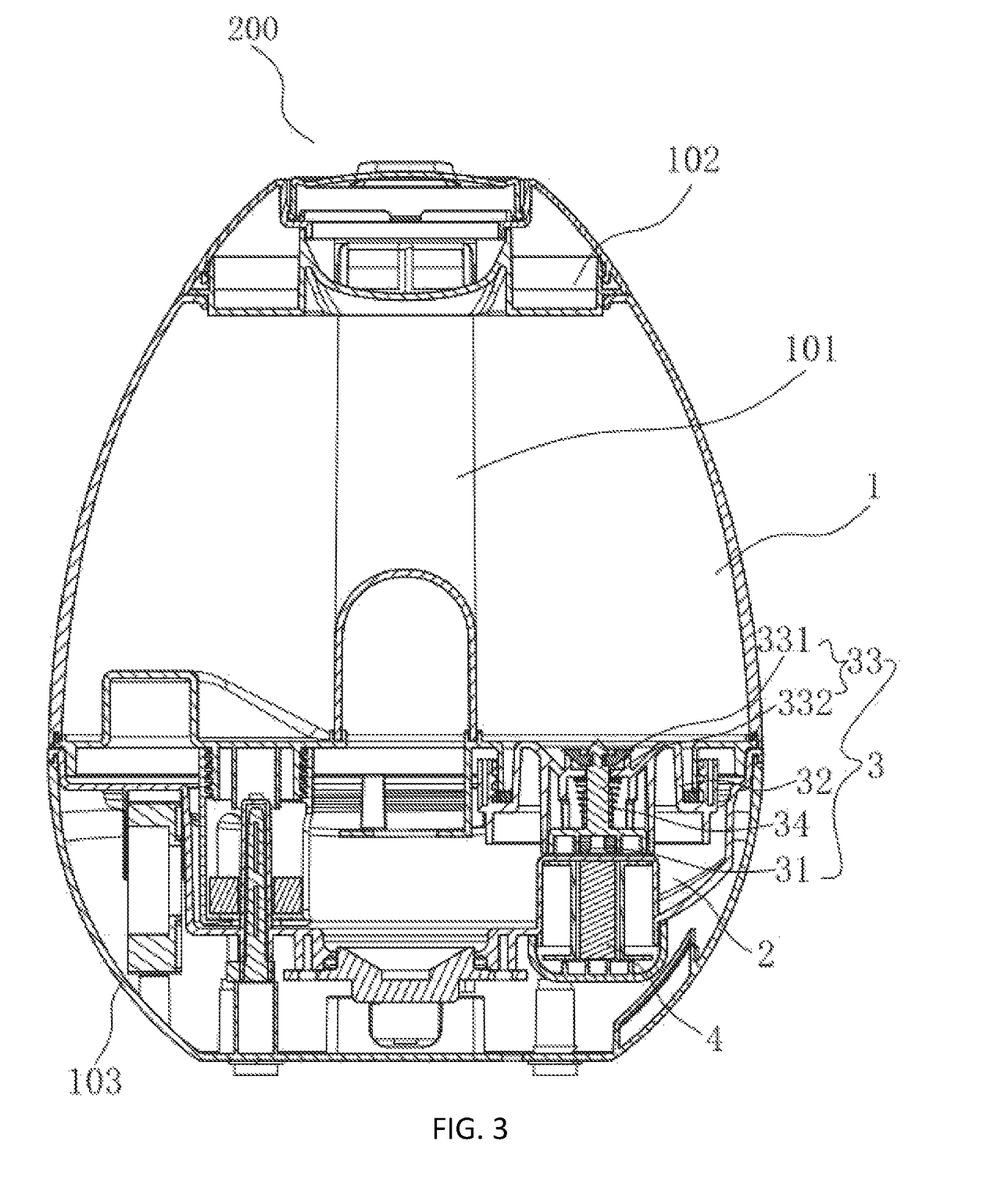
FIG. 3 is a sectional view of a humidifier according to the above embodiment of the present invention.

The magnetic force generated by the magnetic power generator 4 acts with the magnetic element 31 of the water outlet valve 3 across the wall of the water slot 2 so as to drive the sealing part (i.e. the valve gate or the valve plate) of the water outlet valve 3 to open or close a water hole 322 of the water outlet valve 3. The water outlet valve 3 comprises a valve seat 32 and a valve core 33. The valve seat 32 is sealingly coupled at the outlet of the water tank 1. The valve seat 32 comprises the water hole 322 arranged therein. The valve core 33 is arranged in the water hole 322. A bottom end of the valve core 33 is coupled with the magnetic element 31 so as to interact with the magnetic power generator 4 for controlling the valve core 33 to open or close the water hole 322 of the water outlet valve 3. The valve seat 32 further comprises an outer ring 323 provided outside the center of the water hole wherein a loop is defined between the outer ring and the center of the water hole. The outer ring 323 has one or more threads inside thereof for affixing and connection with the water tank. The valve core 33 comprises a valve plate 331 and a valve rod 332. The valve plate 331 (or also called valve gate) is connected with the valve rod 332. The valve plate 331 seals the water hole 322 of the valve seat. The valve rod 332 extends toward the water slot. A bottom end of the valve rod 332 is coupled with the magnetic element 31. Referring to FIG. 3, the magnetic element 31 is arranged in a waterproof chamber in the bottom end of the valve rod 332. The valve rod 332 comprises a guiding portion 333 arranged on a side thereof. The guiding portion 333 radially and symmetrically extends toward two sides of the valve rod 332. The guiding portion 333 can also be integrally formed with the valve rod 332. The valve seat 32 comprises a guiding groove 321 arranged thereon matching with the guiding portion 333. The valve core 33 shifts up and down along the guiding groove 321 so as to attach or detach the valve plate 331 and the water hole 322 of the valve seat. According to the present invention, the valve rod 332 can also be made of the material of the magnetic element 31 and be integrally formed with the magnetic element 31. Namely, the valve rod 332 will carry ferromagnetism and the bottom end of the valve rod 332 will have an N-pole or S-pole, as illustrated in FIG. 1 or 2. The valve rod 332 comprises a return spring 34 sleeved thereon.

The return spring 34 is positioned below the water hole 322 of the valve seat 32 so as to secure the valve plate 331 above the water hole 322 on the water hole 322 of the valve seat 21. The return spring 34 a compression spring having a bigger end biased against and around a lower side of the water hole 322 of the valve seat 32 and a smaller end biased against a junction of the valve rod 332 and the guiding portion 333.

The water slot 2 has an external groove provided thereon corresponding to a location of the outlet of the water tank 1. The magnetic power generator 4 is arranged in the external groove. The magnetic power generator 4 comprises a pontil 41 and a coil 42 winded around the pontil 41. The coil 42 is connected to external direct current power supply so as to, based on the current flow, generate magnetic force of N-pole or S-pole on the magnetic power generator 4 toward an acting end of the magnetic element 31. The magnetic force of N-pole or S-pole generates magnetomotive force by interacting with the S-pole or N-pole of the magnetic element 31 across the wall of the water slot 2. The physical principle of repulsion or attraction between the same or different poles is utilized, allowing the valve core 33 to be coupled with the magnetic element 31 to open or close the water hole 322 of the water outlet valve 3. The water slot 2 comprises a water level detection device 5 arranged therein for connecting with a controller. The controller controls the current direction of the coil 33 of the magnetic power generator 4. When the water slot 2 is in a low water state, the water level detection device 5 sends a low water signal to the controller, so the magnetic power generator 4 generates a magnetic force of the same pole to the magnetic element 31 so as to push the valve core 33 to open the water hole 322 of the water outlet valve 3 to provide supplement water. When the water slot 2 is in a full water state, the water level detection device 5 sends a full water signal to the controller, so the magnetic power generator 4 generates magnetic force of the opposite pole to the magnetic element 31 so as to attract the valve core 33 to close the water hole 322 of the water outlet valve 3.

Figure 4:
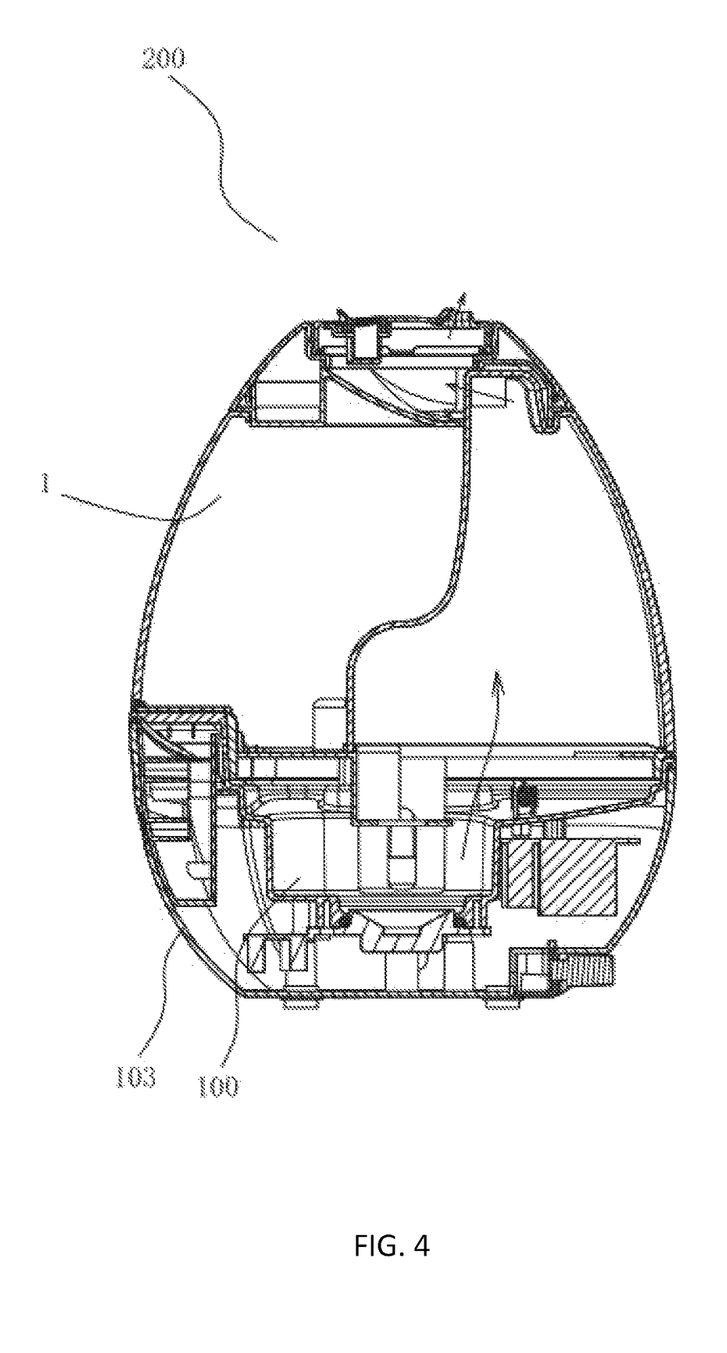
FIG. 4 is another sectional perspective view of a humidifier according to the above embodiment of the present invention.
Figure 5:
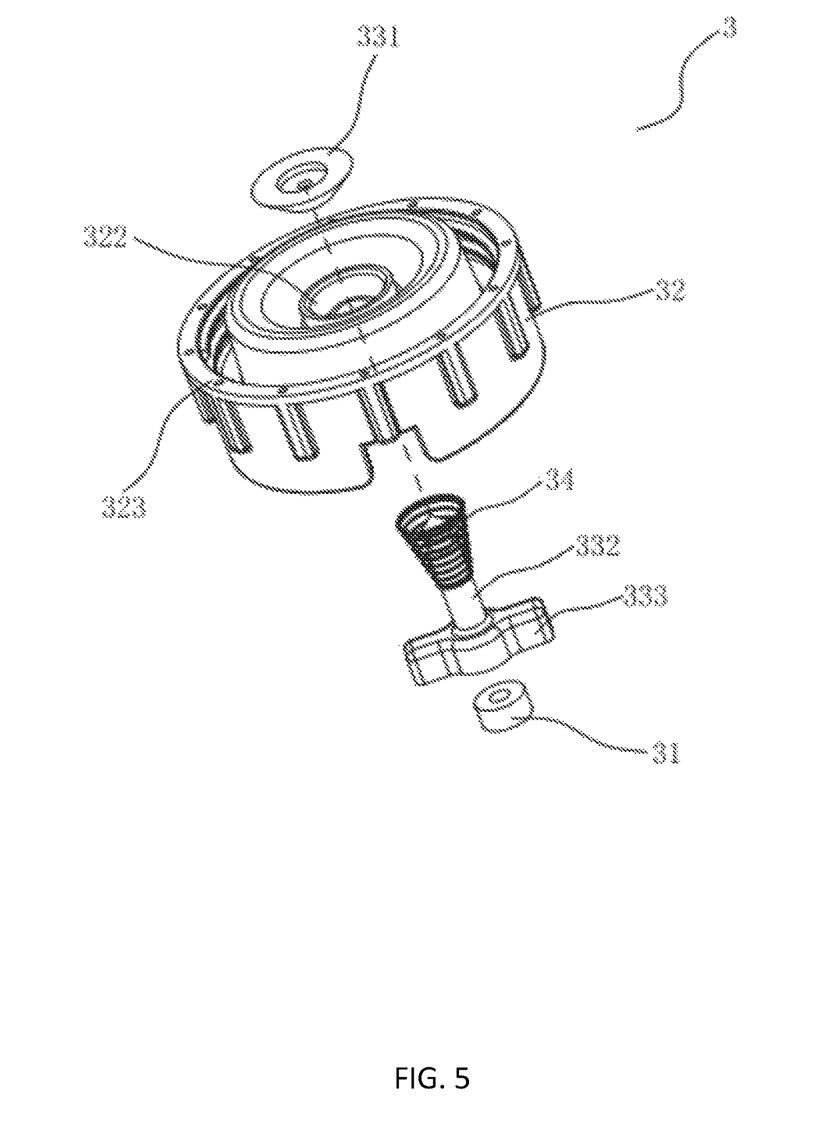
FIG. 5 is an exploded perspective view of a water outlet valve of a humidifier according to the above embodiment of the present invention.
Figure 6:
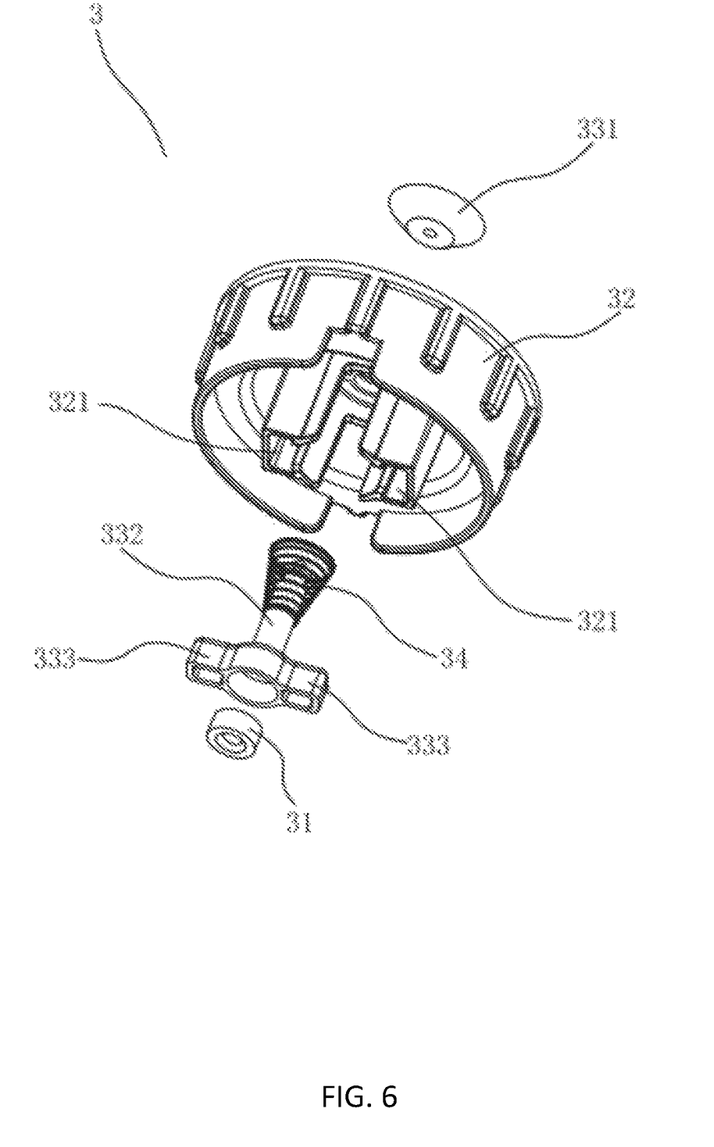
FIG. 6 is an exploded perspective view of another angle illustrating a water outlet valve according to the above embodiment of the present invention.

Referring to FIGS. 3-4, an air humidifier according to the exemplary embodiment of the present invention is illustrated, which comprises a magnetic suspension type water adding device 100 as described in the above embodiment of the present invention, a water lid 102, and a base 103. The water tank 1 further comprises a steam pipe 101 arranged therein. The bottom of the steam pipe 101 is connected with the water slot 2, while the top of the steam pipe 101 penetrates the water lid 102 to form a steam outlet. The water tank 1 is installed on the base 103 and the water slot 2 is provided on the base 103 coupled with the water tank 1.

The operation of the humidifier and its magnetic suspension type water adding device 100 according to the present invention is described below:

I. Description of the Adding Water Mode of the Water Tank 100

(1) When water is added from the top, the valve (water outlet valve 3) seals the outlet of the water tank 1 with the silicone sealing ring (the valve plate 331 or valve) under the effect of the return spring 34, so as to keep the water from flowing into the water slot 2 due to gravity.

(2) Another function of utilizing return spring on the valve (water outlet valve 3) is that when the water tank 1 is lifted, the silicone sealing ring can still fit tight on the outlet under the acting force of the spring, so as to prevent leaking and avoid wet floor caused by water leakage as the water tank 1 is brought up.

II. Description of the Intaking Water (Supplementing Water) Mode of the Water Slot 2

Referring to FIG. 2, when the machine (humidifier) is turned on, if the water level detection device 5 detects that the water level of the water slot 2 is under a predetermined value, the low water mode is actuated. The low water mode enables the coil circuit in the base 103 and provide a direct current thereto. Due to the flowing electric current in the coil 33, the pontil in the middle generates magnetism with N-pole up and S-pole down, which is a phenomenon based on the electromagnetism. Either there is a pillar, which is a permanent magnet, in the center of the silicone sealing ring (the valve plate 331) of the water slot 2, or the valve rod 332 is connected with a ferromagnetic magnetic element 31 with N-pole down and S-pole up, as shown in the drawings. Under the effect of the physical principle of repulsion or attraction between same or different poles, the force of the return spring 34 is overcome, such that the permanent magnet will be forced to move up. Due to the action of the up moving permanent magnet, the sealing ring (valve plate) is simultaneously moved to open the water hole, so that water in the water tank 1 will flow into the water slot 2 under the effect of gravity.

III. Description of the Full Water State of the Water Slot 2

If the water level detection device 5 detects that the water level of the water slot 2 is higher than a predetermined value, the full water mode is actuated. The full water mode enables the coil circuit in the base 103 and provide a direct current thereto. Due to the flowing electric current in the coil 33, the pontil in the middle generates magnetism with S-pole up and N-pole down, which is a phenomenon based on the electromagnetism. Either there is a pillar, which is a (ferromagnetic) permanent magnet 31, in the center of the silicone sealing ring (the valve plate) of the water slot 2, or the valve rod 332 is connected with a ferromagnetic magnetic element 31 with N-pole down and S-pole up. Under the effect of the physical principle of repulsion or attraction between same or different poles, the permanent magnet will be moved down. Due to the action of the down moving permanent magnet, the sealing ring (valve plate) is simultaneously moved to seal the outlet of the water tank 2, as illustrated in FIG. 1, so as to stop water in the water tank 1 from flowing into the water slot 2.

One skilled in the art will understand that the embodiment of the present invention as shown in the drawings and described above is exemplary only and not intended to be limiting.

What is claimed is:

1. A magnetic suspension type water adding device, comprising:
   a water tank having a bottom and an outlet arranged in said bottom;
   a water slot, provided under said tank, providing a space therein for steam formation;
   a water outlet valve arranged at said outlet of said water tank to selectively open or close said outlet of said water tank adapted for controlling water in said water tank from flowing into said water slot, wherein said water outlet valve comprises a magnetic element arranged thereon, a valve seat and a valve core, wherein said valve seat which is sealingly coupled at said outlet of said water tank has a water hole provided therein, wherein said valve core which is movably arranged at said water hole comprises a valve rod and a valve plate connected with said valve rod, wherein said valve plate movably seals said water hole of said valve seat;

wherein said valve rod has a bottom end extended toward said water slot and coupled with said magnetic element and a guiding portion arranged on a side thereof, wherein said guiding seat has a guiding groove provided thereon matching with said guiding portion, wherein said valve core shifts up and down along said guiding groove so as to drive said valve plate to selectively open or close said water hole; and a magnetic power generator, wherein said magnetic element is coupled with said magnetic power generator so as to form a magnetic suspension switch structure for said water outlet valve, wherein said magnetic power generator is arranged outside said water slot, wherein a magnetic force generated by said magnetic power generator acts with said magnetic element of said water outlet valve across a wall of said water slot so as to drive said water outlet valve to selectively open or close said outlet of said water tank, wherein a bottom end of said valve core is coupled with said magnetic element so as to driven by said magnetic power generator to selectively open or close said water hole.

2. The magnetic suspension type water adding device, as recited in claim 1, wherein said water outlet valve further comprises a return spring sleeved on said valve rod below said water hole so as to keep said valve plate secured on said water hole.

3. A magnetic suspension type water adding device, comprising:
  a water tank having a bottom and an outlet arranged in said bottom;
  a water slot, provided under said tank, providing a space therein for steam formation, wherein said water slot has an external groove arranged thereon, corresponding to a location of said outlet of said water tank;
  a water outlet valve arranged at said outlet of said water tank to selectively open or close said outlet of said water tank adapted for controlling water in said water tank from flowing into said water slot, wherein said water outlet valve comprises a magnetic element arranged thereon; and
  a magnetic power generator, wherein said magnetic element is coupled with said magnetic power generator so as to form a magnetic suspension switch structure for said water outlet valve, wherein said magnetic power generator is arranged outside said water slot, wherein a magnetic force generated by said magnetic power generator acts with said magnetic element of said water outlet valve across a wall of said water slot so as to drive said water outlet valve to selectively open or close said outlet of said water tank, wherein said magnetic power generator is arranged in said external groove of said water slot and comprises a pontil and a coil winded around said pontil, wherein said coil is connected to an external direct current power supply so as to, based on a current flow provided, generate magnetic force of N-pole or S-pole on said magnetic power generator toward an end of said magnetic element, wherein the magnetic force of N-pole or S-pole generates magnetomotive force by interacting with the S-pole or N-pole of said magnetic element across said wall of said water slot, so as to drive said valve core coupled with said magnetic element to selectively open or close said outlet.

4. The magnetic suspension type water adding device, as recited claim 3, further comprising a controller for providing and controlling a current direction for said coil of said magnetic power generator, wherein said water slot comprises a water level detection device arranged therein connecting with said controller.

5. The magnetic suspension type water adding device, as recited in claim 4, wherein when said water slot is in a low water state, said water level detection device sends a low water signal to said controller, so that said magnetic power generator generates a magnetic force of the same pole to said magnetic element so as to push said valve core to open said water hole of said water outlet valve to provide supplement water, wherein when said water slot is in a full water state, said water level detection device sends a full water signal to said controller, so that said magnetic power generator generates magnetic force of the opposite pole to said magnetic element so as to attract said valve core to close said water hole of said water outlet valve.

6. An air humidifier, comprising:
  a magnetic suspension type water adding device which comprises:
  a water tank having a bottom and an outlet arranged in said bottom;
  a water slot under said water tank, providing a space therein for steam formation, and having an external groove arranged thereon, corresponding to a location of said outlet of said water tank, wherein said magnetic power generator is arranged in said external groove;
  a water outlet valve arranged in said outlet of said water tank to selectively open or close said outlet of said water tank adapted for controlling water in said water tank from flowing into said water slot, wherein said water outlet valve comprises a magnetic element arranged thereon; and
  a magnetic power generator, wherein said magnetic element is coupled with said magnetic power generator so as to form a magnetic suspension switch structure for said water outlet valve, wherein said magnetic power generator is arranged outside said water slot, wherein a magnetic force generated by said magnetic power generator acts with said magnetic element of said water outlet valve across a wall of said water slot so as to drive said water outlet valve to selectively open or close said outlet of said water tank, wherein said magnetic power generator comprises a pontil and a coil winded around said pontil, wherein said coil is connected to an external direct current power supply so as to, based on a current flow provided, generate magnetic force of N-pole or S-pole on said magnetic power generator toward an end of said magnetic element, wherein the magnetic force of N-pole or S-pole generates magnetomotive force by interacting with the S-pole or N-pole of said magnetic element across said wall of said water slot, so as to drive said valve core coupled with said magnetic element to selectively open or close said outlet.

7. The air humidifier, as recited in claim 6, further comprising a base, wherein said water tank is installed on said base and said water slot is provided on said base and coupled with said water tank.

8. The air humidifier, as recited in claim 7, wherein said water tank further comprises a steam pipe arranged therein, wherein a bottom of said steam pipe is connected with said water slot, wherein said water slot further comprises a water lid on a top thereof, wherein said top of said steam pipe penetrates said water lid to form a steam outlet.

9. An air humidifier, comprising:
  a magnetic suspension type water adding device which comprises:

a water tank having a bottom and an outlet arranged in said bottom, wherein said water tank further comprises a steam pipe arranged therein;

a water slot under said water tank, providing a space therein for steam formation and comprising a water lid on a top thereof, wherein a bottom of said steam pipe is connected with said water slot and a top of said steam pipe penetrates said water lid to form a steam outlet;

a water outlet valve arranged in said outlet of said water tank to selectively open or close said outlet of said water tank adapted for controlling water in said water tank from flowing into said water slot, wherein said water outlet valve comprises a magnetic element arranged thereon;

a magnetic power generator, wherein said magnetic element is coupled with said magnetic power generator so as to form a magnetic suspension switch structure for said water outlet valve, wherein said magnetic power generator is arranged outside said water slot, wherein a magnetic force generated by said magnetic power generator acts with said magnetic element of said water outlet valve across a wall of said water slot so as to drive said water outlet valve to selectively open or close said outlet of said water tank; and a base, wherein said water tank is installed on said base and said water slot is provided on said base and coupled with said water tank.

10. An air humidifier, comprising:

a magnetic suspension type water adding device which comprises:

a water tank having a bottom and an outlet arranged in said bottom;

a water slot under said water tank, providing a space therein for steam formation;

a water outlet valve arranged in said outlet of said water tank to selectively open or close said outlet of said water tank adapted for controlling water in said water tank from flowing into said water slot, wherein said water outlet valve comprises a magnetic element arranged thereon, wherein said water outlet valve further comprises a valve seat and a valve core, wherein said valve seat is sealingly coupled at said outlet of said water tank, wherein said valve seat has a water hole provided therein, wherein said valve core is movably arranged at said water hole and comprises a valve rod and valve plate connected with said valve rod, wherein said valve plate movably seals said water hole of said valve seat, wherein a bottom end of said valve rod is extended toward said water slot and coupled with said magnetic element, wherein said valve rod comprises a guiding portion arranged on a side thereof, wherein said valve seat further has a guiding groove provided thereon matching with said guiding portion, wherein said valve core shifts up and down along said guiding groove so as to drive said valve plate to selectively open or close said water hole;

a magnetic power generator, wherein said magnetic element is coupled with said magnetic power generator so as to form a magnetic suspension switch structure for said water outlet valve, wherein said magnetic power generator is arranged outside said water slot, wherein a magnetic force generated by said magnetic power generator acts with said magnetic element of said water outlet valve across a wall of said water slot so as to drive said water outlet valve to selectively open or close said outlet of said water tank, wherein a bottom end of said valve core is coupled with said magnetic element so as to be driven by said magnetic power generator to selectively open or close said water hole.

11. The air humidifier, as recited in claim 10, wherein said water outlet valve further comprises a return spring sleeved on said valve rod below said water hole so as to keep said valve plate secured on said water hole.

12. The air humidifier, as recited in claim 10, further comprising a base, wherein said water tank is installed on said base and said water slot is provided on said base and coupled with said water tank.

13. The air humidifier, as recited in claim 11, further comprising a base, wherein said water tank is installed on said base and said water slot is provided on said base and coupled with said water tank.

\* \* \* \* \*